US011429722B2

(12) United States Patent
Jeansonne et al.

(10) Patent No.: US 11,429,722 B2
(45) Date of Patent: Aug. 30, 2022

(54) DATA PROTECTION IN A PRE-OPERATION SYSTEM ENVIRONMENT BASED ON AN EMBEDDED KEY OF AN EMBEDDED CONTROLLER

(71) Applicant: Hewlett-Packard Development Company, L.P., Spring, TX (US)

(72) Inventors: Jeffrey Kevin Jeansonne, Houston, TX (US); Rosilet Retnamoni Braduke, Houston, TX (US); Joshua Serratelli Schiffman, Bristol (GB); David Plaquin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 61 days.

(21) Appl. No.: 16/479,737

(22) PCT Filed: Jan. 29, 2018

(86) PCT No.: PCT/US2018/015767
§ 371 (c)(1),
(2) Date: Jul. 22, 2019

(87) PCT Pub. No.: WO2019/147288
PCT Pub. Date: Aug. 1, 2019

(65) Prior Publication Data
US 2021/0406378 A1    Dec. 30, 2021

(51) Int. Cl.
*G06F 21/57* (2013.01)
*G06F 21/55* (2013.01)
*G06F 21/60* (2013.01)

(52) U.S. Cl.
CPC .......... *G06F 21/575* (2013.01); *G06F 21/556* (2013.01); *G06F 21/577* (2013.01); *G06F 21/602* (2013.01); *G06F 2221/0751* (2013.01)

(58) Field of Classification Search
CPC .... G06F 21/575; G06F 21/556; G06F 21/577; G06F 21/602; G06F 2221/0751
See application file for complete search history.

(56) References Cited

U.S. PATENT DOCUMENTS 9,165,143 B1    10/2015  Sanders et al.
9,621,549 B2    4/2017   Benoit et al.
(Continued)

OTHER PUBLICATIONS

Zhao et al: "Gracewipe: Secure and Verifiable Deletion under Coercion", Proceedings Network and Distributed System Security Symposium, Feb. 8, 2015, 16 pages.

*Primary Examiner* — Jung W Kim
*Assistant Examiner* — Alan Lingqian Kong
(74) *Attorney, Agent, or Firm* — HPI Patent Department

(57) ABSTRACT

An example system with a pre-OS (Operating System) environment, the pre-OS environment includes a private memory that is isolated from a processor of the system. The pre-OS environment also includes an embedded controller (EC) coupled to the private memory, where the EC includes an embedded key. The EC is to execute instructions to generate an encryption key based on the embedded key; generate a signature key; obtain data; produce an integrity-verification tag based on a hash of the obtained data, where the hash employs the signature key; encrypt the obtained data based on the encryption key; store the encrypted data in the private memory; and store the integrity-verification tag in the private memory in association with the stored encrypted data.

13 Claims, 4 Drawing Sheets

(56) References Cited

U.S. PATENT DOCUMENTS

| | | | |
|---|---|---|---|
| 9,792,229 B2 | 10/2017 | Kishinevsky et al. | |
| 2005/0246771 A1* | 11/2005 | Hunt | H04L 9/3273 726/18 |
| 2007/0006169 A1 | 1/2007 | Iliev et al. | |
| 2008/0244257 A1 | 10/2008 | Vaid et al. | |
| 2009/0063865 A1* | 3/2009 | Berenbaum | H04L 9/3247 713/180 |
| 2009/0327678 A1* | 12/2009 | Dutton | G06F 21/575 713/2 |
| 2010/0082955 A1* | 4/2010 | Chhabra | G06F 21/572 713/1 |
| 2011/0082983 A1* | 4/2011 | Koktan | G06F 12/0804 711/135 |
| 2014/0130151 A1 | 5/2014 | Krishnamurthy et al. | |
| 2014/0298040 A1* | 10/2014 | Ignatchenko | G06F 21/72 713/192 |
| 2015/0124961 A1* | 5/2015 | Lambert | H04L 9/14 380/44 |
| 2015/0324588 A1* | 11/2015 | Locke | G06F 21/562 713/2 |
| 2016/0103765 A1* | 4/2016 | Rastogi | G06F 12/123 711/119 |
| 2016/0357963 A1* | 12/2016 | Sherman | G06F 21/575 |
| 2017/0230179 A1 | 8/2017 | Mannan et al. | |
| 2017/0244568 A1* | 8/2017 | Brickell | H04W 12/041 |
| 2017/0300251 A1 | 10/2017 | Kota et al. | |
| 2017/0337380 A1* | 11/2017 | Domke | G06F 9/442 |
| 2019/0238329 A1* | 8/2019 | Leara | G06F 7/58 |

\* cited by examiner

DATA PROTECTION IN A PRE-OPERATION SYSTEM ENVIRONMENT BASED ON AN EMBEDDED KEY OF AN EMBEDDED CONTROLLER

BACKGROUND

Unified Extensible Firmware Interface (UEFI) and Basic Input-Output System (BIOS) are examples of pre-operating system (pre-OS) environments. These are low-level programs that execute when a computing system is initiated. These pre-OS programs are responsible for waking up the computing system's hardware components and generally preparing for the operating system to take control of the computing system. Thereafter, the pre-OS programs may run a bootloader that boots an operating system installed in the computing system.

Some pre-OS programs support a so-called secure boot, which includes checking the validity of the operating system to ensure that there is no tampering with the boot process. Some pre-OS programs check to see what hardware components the computing system includes, wakes up the hardware components, and hands them to the operating system. Most pre-OS environments include programmable modules, and as such, original equipment manufacturer (OEM) developers can add application and drivers, allowing the pre-OS programs to function as a lightweight operating system.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

An example pre-operating system (pre-OS) environment includes an embedded controller (EC) and an isolated (i.e., private) memory. Both the EC and the private memory may be isolated from a central processing unit (CPU) and the remainder of the computing system. This isolation protects the data of the pre-OS environment from software attacks. However, the isolation does not protect the pre-OS data from a physical attack. That is, without additional pre-OS data protection, an intruder with unfettered physical access to the computing system may obtain and alter the pre-OS data by physical electrical connectivity to the otherwise isolated memory.

Described herein is a technology that ensures confidentiality and integrity of data stored in the memory of the pre-OS environment by encrypting data based on keys derived from a base or seed key that is installed within the EC. The EC-installed seed key is inaccessible and unattainable outside the EC.

In addition, the technology described herein verifies the integrity of the data stored in the isolated memory based on keys derived from the EC-installed seed key.

If an intruder obtains physical access to a computer system with the technology described herein implemented therein, the intruder may be able to copy the data from the isolated memory of the pre-OS environment. However, the intruder would be unable to decrypt that data because the EC-installed seed key from which the encryption keys were created is locked away inside the EC itself of that pre-OS environment in a manner where that EC-installed seed key is inaccessible and unattainable outside of that EC.

Similarly, any modifications that the intruder makes to the data stored in the isolated memory would be detectable because the intruder would not have access to the same EC-installed seed key which was used to create integrity or tamper-detection tags stored in association with the data in the memory.

Figure 1:
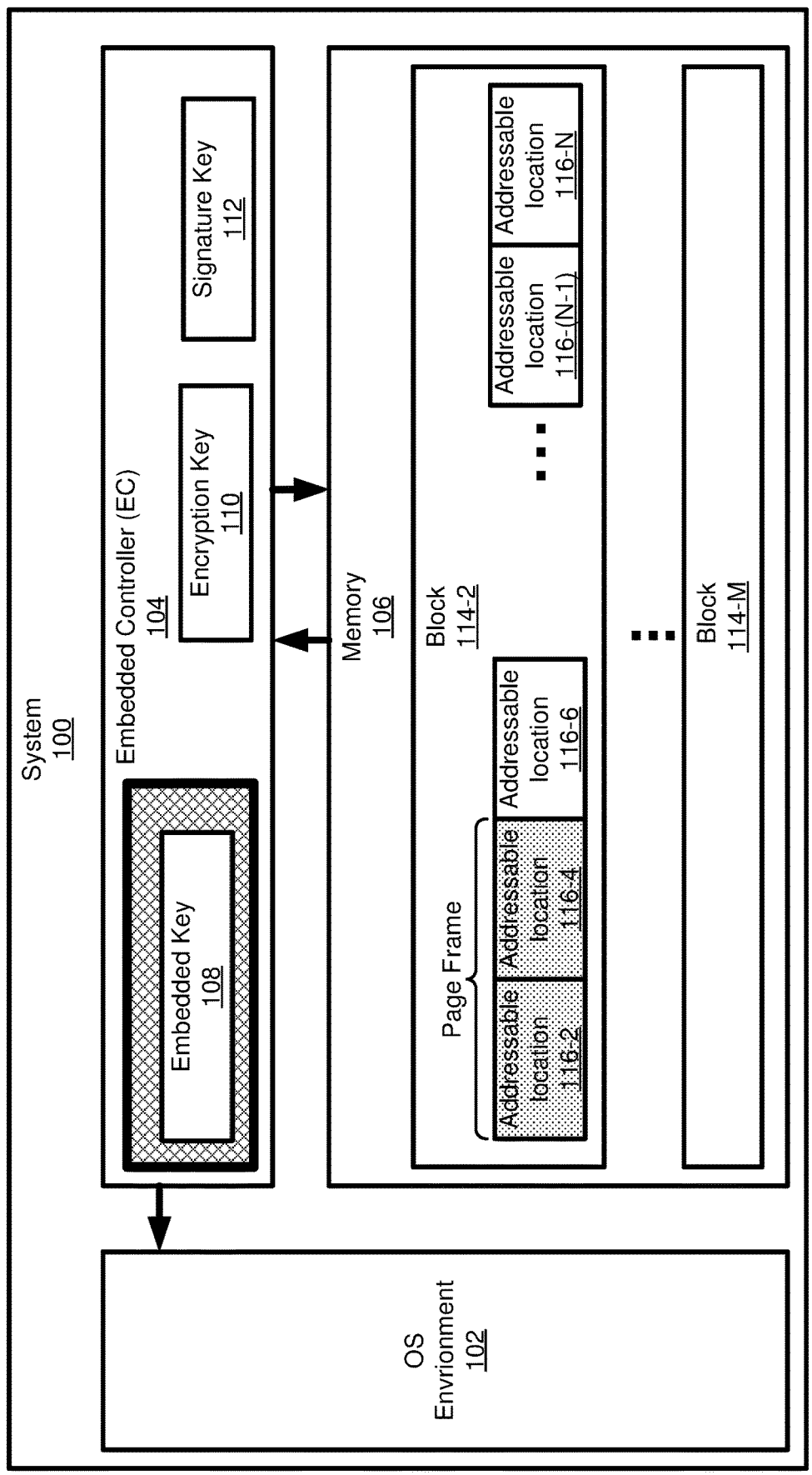
FIG. 1 is an example block diagram of an apparatus that implements data protection in a pre-OS environment in accordance with the technology described herein.

FIG. 1 illustrates an example block diagram of an apparatus that implements data protection in a pre-OS environment in accordance with the technology described herein. Particularly, the apparatus may include a computer system 100. As depicted, the computer system 100 includes an operating system (OS) environment 102 and a pre-OS environment. As depicted, the pre-OS environment includes a controller or an embedded controller (EC) 104 and a memory 106.

The OS environment 102 includes processors, graphics controllers, memory, secondary storage, communications interfaces, and the like. The pre-OS environment may communicate with some of the parts of the OS environment 102 during the pre-OS or pre-boot stage. However, with the computer system 100, the processor may not access security keys or codes on the EC 104, memory 106, or any of the pre-OS environment components.

The EC 104 further includes an embedded key 108, an encryption key 110, and a signature key 112. The embedded key 108 is the base or seed key that is permanently installed or embedded within the EC. The embedded key 108 is inaccessible and unattainable outside the EC. That is, the processor or any other component in the OS environment 102 cannot access the embedded key 108.

The embedded key 108 is permanently fixed upon the initial operation of the EC. The embedded key 108 may be unique to each EC. That is, no two ECs have the same embedded key.

The embedded key 108 is a randomly generated number that is fused to a one-time-programmable (OTP) memory of the EC. Once fused, the embedded key cannot be altered ever by any means without destroying or disabling the EC.

For example, at a factory setting, or upon delivery of the EC 104 to an end-user, the EC 104 performs a first code execution or an initial operation that fuses the randomly generated number to an internal OTP memory of the EC 104.

The embedded key 108 may be used to seed the encryption key 110 and signature key 112. Before data is stored in the memory 106, that data is encrypted using the encryption key 110 that is based upon a combination of an initialization vector and the embedded key 108.

In order to be able to detect any tampering of stored data, a signature key 112 is generated based on the embedded key 108. Then, an integrity-verification tag is generated based on the data itself and the signature key 112. Thereafter, that tag is stored in association with the data in the memory 106.

The memory 106, which may be exclusively coupled to the EC 104 and isolated from the OS environment 102, may include a plurality of M blocks such as block 114-2 to 114-M. Each of these M blocks includes addressable locations. As depicted, the first block 114-2 includes addressable locations 116-2 to 110-N.

The computer system 100 may include (but is not limited to) a computer, a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

The EC 104 may facilitate a secure boot of the OS. In this example, the EC 104 may have exclusive access to the memory 106 in examining, authenticating, and approving datasets or software signatures to implement the secure boot. The examining, authenticating, and the approving of the datasets may utilize different keys of the EC 104 as described herein.

Based on the embedded key 108, the EC 104 may be configured to generate the encryption key 110 and the signature key 112. That is, the embedded key 108 may be used as a seed to generate the encryption key 110 and the signature key 112. The generated encryption key 110 may be used for encryption of data set, while the signature key 112 may be used to produce an integrity-verification tag for the encrypted data set. The use of encryption and the use of integrity-verification tag are further combined with a manner of updating data sets on the memory 106 in order to provide another layer of security against a physical attack on the pre-OS environment.

The encryption key 110 may be based upon a combination of an initialization vector and embedded key 108. The initialization vector may be an arbitrary number that is changed for each encryption of data set. In addition, the EC 104 may generate a randomly generated number based on the embedded key 108 and that randomly generated number may be used in the generation of the encryption key 110.

For example, the encryption key 110 includes the initialization vector, which is a data set field that is incremented after each encryption by the EC 104. In this example, the initialization vector, which is incremented based from previous encryption, is combined with the randomly generated number from the EC 104 to provide the encryption key 110. In this case, a physical attack based upon last value of the initialization vector is avoided because of the presence of the randomly generated number.

The signature key 112 may include a function that is used to generate an integrity-verification tag based on a hash of the data set that is ready to be stored. The generated integrity-verification tag may include a computed keyed-hash message authentication code (HMAC) that is based upon a keyed cryptographic hash function. The signature key 112, in this case, may be used to compute the HMAC tag that is associated with the stored data set on the memory 106.

Referencing the HMAC tag, the EC 104 may use the HMAC tag to detect whether changes were made to the stored data set in the private memory. For example, the signature key 112 is used to calculate an initial value of the associated HMAC tag based on data set name; data set size, and data value. During a read operation, the EC 104 may verify the associated HMAC tag by calculating current values using the same signature key 112, and comparing these current values with the initial value of the associated HMAC tag. This comparison may indicate the integrity of the associated data set as described herein.

The memory 106 is a private and isolated memory that may include a non-volatile storage such as, but not limited to, a solid-state non-volatile computer storage medium that employs NOR logic gates. An example of this type of solid-state non-volatile computer storage is NOR flash memory. The NOR flash memory may provide a faster reading of data; however, it may take longer to erase and write new data because of its block-erasure feature.

In an embodiment, the NOR flash memory features may be taken advantage of in the storing of the encrypted data. Particularly, the ability of the NOR flash memory feature to have one bit changed in one direction, and the erasing of all bits in the opposite direction.

For example, the encrypted data set and associated integrity-verification tag are stored on the addressable locations 116-2 to 116-4. In case of a subsequent encrypted data set to be stored on the same block 114-2, any bit "1" of the addressable locations 116-2 to 116-4 may be changed to zero to indicate invalidity and alteration of the stored data set. This basis of invalidity may be implemented separately from the integrity verification based upon the signature key 112 that is used to generate the associated integrity-verification tag.

Figure 2:
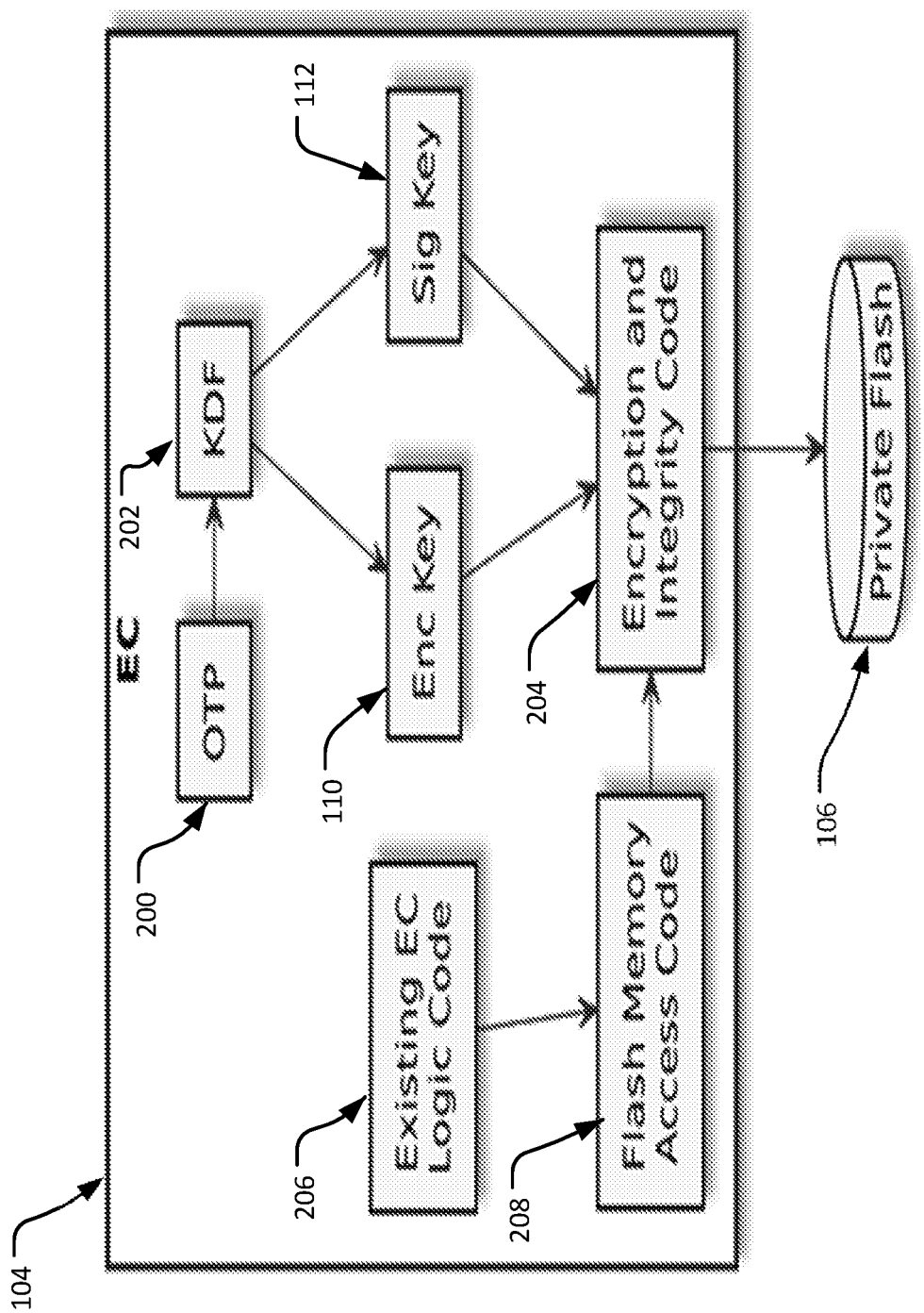
FIG. 2 illustrates an example implementation of an embedded controller (EC) that stores and reads data from a private memory in accordance with implementations described herein.

FIG. 2 illustrates an example implementation of an embedded controller (EC) that stores and reads data from a private memory in accordance with implementations described herein.

As depicted, the EC 104 includes an OTP 200, a key derivation function (KDF) 202, encryption key 110, signature key 112, encryption and integrity code 204, an EC logic code 206, and a flash memory access code 208 to access the memory 106. The memory 106 may store, for example, data sets used by the EC 104 during the computer system's initial boot sequence and hardware initialization. In another example, the memory 106 may store plain data set that may be accessible to the OS environment 102. The plain data set, in this other example, is not encrypted nor used in the computer system's initial boot sequence and hardware initialization.

As described herein, the embedded key 108 may be permanently fixed at the OTP 200. The OTP 200 may include an internal memory that is not accessible nor attainable from outside the EC 104. For example, the OTP 200 may include a non-volatile memory where each bit is locked by a fuse. In this example, the embedded key 108 that is fused to the OTP 200 cannot be accessed or attained from the EC 104. Particularly, the OS environment 102 and outside physical attack.

The KDF 202 may be configured to derive one or more secret keys from a secret value of the embedded key 108 fused on the OTP 200. For example, the KDF 202 may utilize a pseudorandom function, keyed cryptographic has functions, etc. in generating the encryption key 110 and the signature key 112. In this example, the KDF 202 uses the embedded key 108 for producing the encryption and signature keys.

The EC logic code 206 may include a firmware to facilitate processes that are internal to the EC 104. For example, the EC logic code 206 may be configured to use access code from the flash memory access code 208 to exclusively couple the EC 104 to the memory 106. In another example, the EC logic code 206 may be used to detect initial operation of the EC 104. In this other example, once the EC logic code 206 detects permanent fusion of the embedded key 108 at the OTP 200, then the EC logic code 206 may facilitate generation of the encryption key 110 and the signature key 112 as depicted.

The flash memory access code 208 may include a password, secret work, identification number, a numeric code, and the like, of the memory 106. As depicted, the EC 104 is exclusively coupled to the memory 106. In this case, the EC 104 may utilize the flash memory access code 208 in order to store to-be-stored data set into the memory 106. The encryption and integrity code 204 include an integrated encrypted data set with the associated integrity-verification tag associated to the to-be-stored data set.

Figure 3:
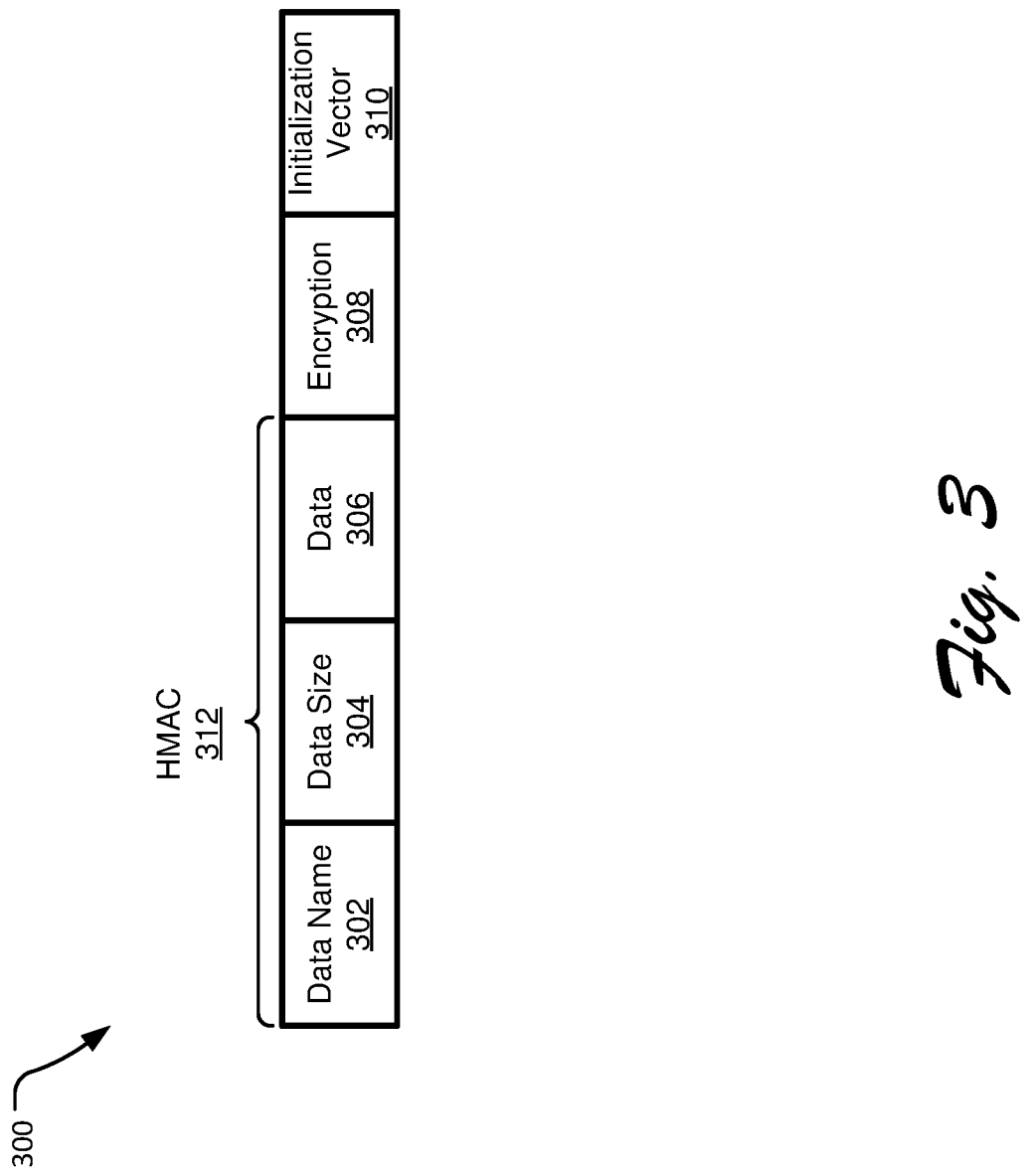
FIG. 3 illustrates an example of to-be-stored data set that is used on a system's initial boot sequence and hardware initialization in accordance with implementations described herein.

FIG. 3 illustrates an example implementation of to-be-stored data set that is used on a system's initial boot sequence and hardware initialization in accordance with implementations described herein. The to-be-stored data set, for example, include data that are used by the EC 104 during a system's initial boot sequence and hardware initialization.

As depicted, different fields of a data set 300 includes data name 302, data size 304, data 306, encryption 308, and initialization vector 310. Furthermore, FIG. 3 shows an HMAC 312 that is used the signature key 112 in computing HMAC value of the data name 302, data size 304 and the data 306 fields.

As described herein, the to-be-stored data set may include the data name 302, data size 304, and the data 306. For example, the data name 302, data size 304, and the data 306 are a particular file name, file size, and file contents, respectively. In this example, the integrity-verification tag as described herein may include their computed HMAC value based on the signature key 112 of the EC 104. The computed HMAC value may be associated with the to-be-stored data for validity and integrity verification.

The encryption 308 may indicate whether the to-be-stored data is encrypted or not. If encrypted, the EC 104 may read the stored data based on the encryption key 110. Furthermore, the reading of the stored data may use a value of the initialization vector 310. As discussed above, the value of the initialization vector 310 may be incremented and used as a basis for subsequent encryption of data.

In a case where the there is no encryption, then the EC 104 may read the plain stored data.

Figure 4:
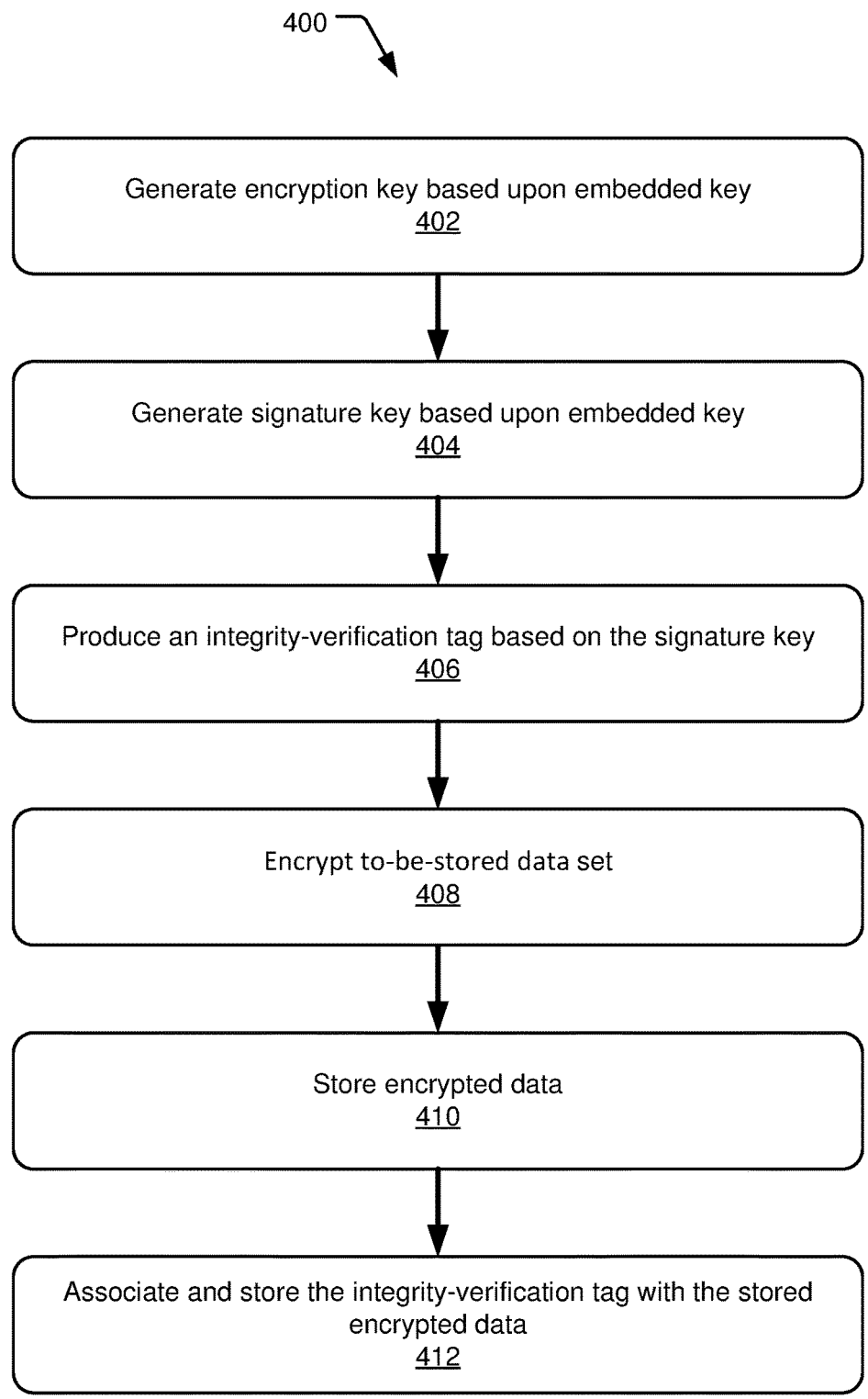
FIG. 4 illustrates a flowchart of an example process for protecting data stored in a private memory of a pre-OS environment in accordance with the technology described herein.

FIG. 4 shows a flowchart of an example process 400 for protecting data stored in a private memory of a pre-OS environment in accordance with the technology described herein. The example process 400 may be performed by, for example, the computer system 100. For the purposes of discussion, an example device like the computer system 100 is described as performing the operations of the example process 400.

At block 402, the example device generates an encryption key based upon an embedded key installed into an embedded controller (EC). For example, the computer system 100 and particularly, the EC 104 generates the encryption key 110 based on the embedded key 108. In this example, the embedded key 108 includes a randomly generated number that is permanently fixed upon initial operation of the EC 104. The EC 104 as described herein may be coupled to a private memory—memory 106 that is isolated from a processor of the computer system 100.

At block 404, the example device generates a signature key based on the installed embedded key. For example, the signature key 112 is derived from the embedded key 108. In this example, the embedded key 108 is used to seed different keys such as the encryption and signature keys.

At block 406, the example device obtains data that is to be stored; then, the example device produces an integrity-verification tag based on a hash of the obtained data, wherein the hash employs the signature key. For example, the integrity-verification tag is the computed HMAC 312 that uses the signature key 112 for calculating HMAC value. In this example, two HMAC values are compared by the EC 104 when reading the stored data for integrity verification. The two HMAC values may include initial HMAC value and subsequently computed HMAC value upon reading of the same data set.

At block 408, the example device encrypts the to-be-stored data based on the encryption key.

At block 410, the example device stores the encrypted data in the private memory. A suitable memory which may be the subject of this example process 400 is a solid-state non-volatile computer storage medium that employs NOR logic gates. That is, a NOR flash memory.

At block 412 the example device stores the integrity-verification tag in the private memory in association with the stored encrypted data.

The blocks 402-412 described above may represent instructions stored on computer-readable storage media that, when executed by at least one processor, may perform the recited operations.

What is claimed is:

1. A system with a pre-OS (Operating System) environment, the pre-OS environment comprises:
 a private memory that is isolated from a processor of the system; and
 an embedded controller (EC) coupled to the private memory, wherein the EC includes an embedded key;
 the EC to execute instructions to:
  generate an encryption key based on the embedded key;
  generate a signature key based on the embedded key;
  obtain data;
  produce an integrity-verification tag based on a hash of the obtained data, wherein the hash employs the signature key;
  encrypt the obtained data based on the encryption key;
  store the encrypted data in the private memory in a first memory block, wherein the private memory includes a solid-state non-volatile computer storage medium that employs NOR logic gates;
  store the integrity-verification tag in the private memory in association with the stored encrypted data, wherein the private memory includes data sets that are used by the EC during a system's initial boot sequence and hardware initialization, and wherein the EC compares a second integrity-verification tag with the integrity-verification tag when the EC reads the stored encrypted data for integrity verification; and
  store a subsequent encrypted data set in the first memory block, wherein any bit "1" of a first addressable location is changed to "0" to indicate alteration of the stored encrypted data.

2. The system of claim 1, wherein the encrypted data stored in the private memory is accessible only to the EC.

3. The system of claim 1, wherein the embedded key is inaccessible and unattainable outside of the EC.

4. The system of claim 1, wherein the integrity-verification tag includes a hash message authentication code (HMAC) that is based upon a keyed cryptographic hash function.

5. The system of claim 4, wherein the EC reads the HMAC based on the signature key.

6. A non-transitory machine-readable storage medium encoded with instructions executable by a processor of a system, the machine-readable storage medium comprising instructions to:
   generate an encryption key based upon an embedded key installed into an embedded controller (EC) of the system;
   generate a signature key based on the embedded key;
   obtain data;
   produce an integrity-verification tag based on a function of the obtained data, wherein the function employs the signature key;
   encrypt the obtained data based on the encryption key;
   store the encrypted data in memory in a first memory block, wherein the memory includes a solid-state non-volatile computer storage medium that employs NOR logic gates;
   store the integrity-verification tag in the memory in association with the stored encrypted data, wherein the memory includes data sets that are used by the EC during a system's initial boot sequence and hardware initialization, and wherein the EC compares a second integrity-verification tag with the integrity-verification tag when the EC reads the stored encrypted data for integrity verification; and
   store a subsequent encrypted data set in the first memory block, wherein any bit "1" of a first addressable location is changed to "0" to indicate alteration of the stored encrypted data.

7. The non-transitory machine-readable storage medium of claim 6, wherein the encryption key is based upon a combination of an initialization vector and a randomly generated number, the randomly generated number being seeded from the embedded key.

8. The non-transitory machine-readable storage medium of claim 7 further comprising instructions to update the encryption key by incrementing the initialization vector used in a previous encryption of data.

9. The non-transitory machine-readable storage medium of claim 6, wherein the embedded key is inaccessible and unattainable outside of the EC.

10. The non-transitory machine-readable storage medium of claim 6, wherein the function is a keyed cryptographic hash function.

11. A non-transitory machine-readable storage medium encoded with instructions executable by an embedded controller (EC) of a pre-OS (Operating System) environment, the machine-readable storage medium comprising instructions to:
   generate an encryption key based upon an embedded key of the EC, wherein the embedded key is inaccessible and unattainable outside the EC;
   generate a signature key based on the embedded key;
   obtain data;
   produce an integrity-verification tag based on a hash of the obtained data, wherein the hash employs the signature key;
   encrypt the obtained data based on the encryption key;
   store the encrypted data in memory in a first memory block, wherein the memory includes a solid-state non-volatile computer storage medium that employs NOR logic gates;
   store the integrity-verification tag in the memory in association with the stored encrypted data, wherein the memory includes data sets that are used by the EC during a system's initial boot sequence and hardware initialization, and wherein the EC compares a second integrity-verification tag with the integrity-verification tag when the EC reads the stored encrypted data for integrity verification; and
   store a subsequent encrypted data set in the first memory block, wherein any bit "1" of a first addressable location is changed to "0" to indicate alteration of the stored encrypted data.

12. The non-transitory machine-readable storage medium of claim 11, the machine-readable storage medium further comprising instructions to update an initialization vector used, at least in part, to generate another encryption key.

13. The non-transitory machine-readable storage medium of claim 11, wherein the integrity-verification tag includes a hash message authentication code (HMAC) that is based upon a keyed cryptographic hash function.

* * * * *